Apr. 24, 1923.
J. H. HAWLEY
1,452,505
TRANSMISSION CONTROL
Filed Sept. 2, 1922
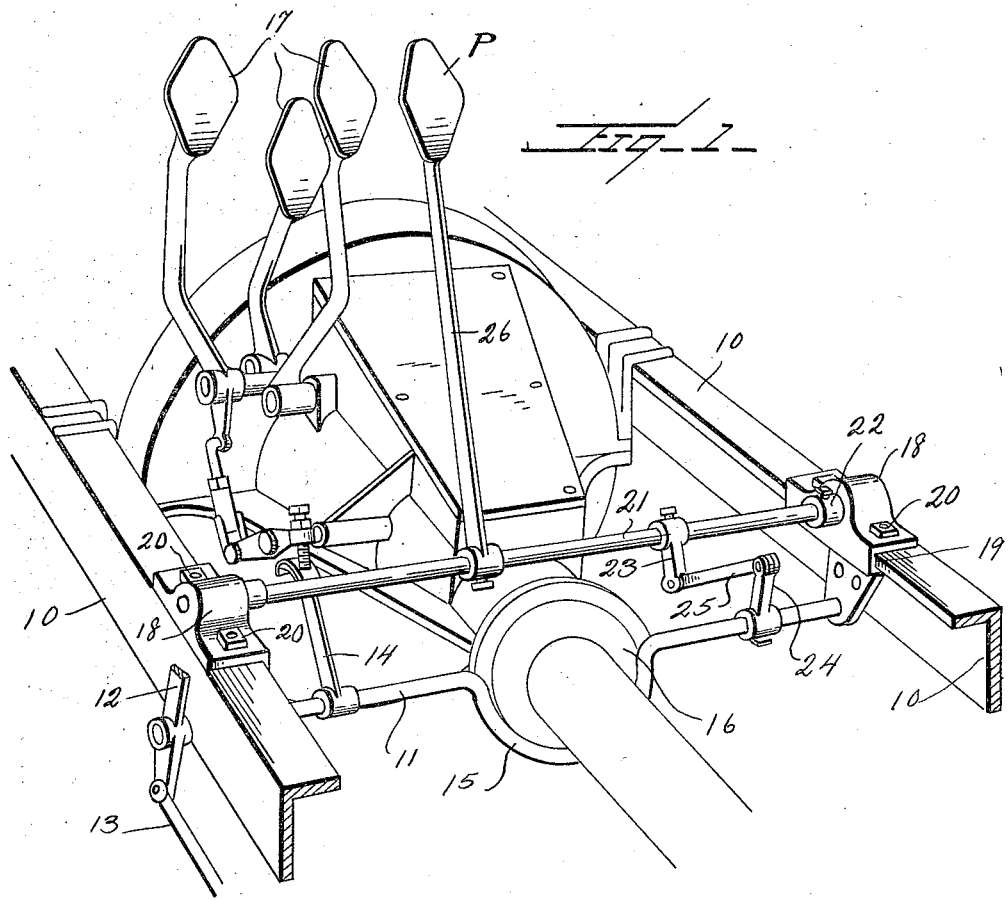
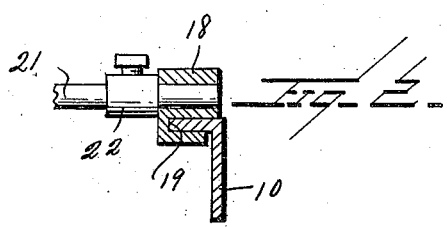
Inventor
J. H. Hawley
By Watson E. Coleman
Attorney Patented Apr. 24, 1923.

1,452,505

UNITED STATES PATENT OFFICE.

JAMES H. HAWLEY, OF STOCKBRIDGE, MICHIGAN.

TRANSMISSION CONTROL.

Application filed September 2, 1922. Serial No. 585,970.

*To all whom it may concern:*

Be it known that I, JAMES H. HAWLEY, a citizen of the United States, residing at Stockbridge, in the county of Ingham and State of Michigan, have invented certain new and useful Improvements in Transmission Controls, of which the following is a specification, reference being had to the accompanying drawings.

This invention relates to improvements in transmission controls, and more particularly to a device for controlling the clutch of transmissions.

An important object of the invention is to provide a device which in addition to controlling the clutch to throw the same into the neutral position, operates the service or emergency brake at the same time.

A further object of the invention is to provide a device of this character so located in the cockpit in which the control levers of the automobile are arranged that it is readily accessible not only to the driver of the vehicle but to a person seated beside the driver.

In one fairly common type of car, control levers of the automobile consist in a plurality of pedals which are operated by the feet of the driver and an emergency brake lever situated at the left hand of the driver by means of which not only may the brake be applied but the clutch of the vehicle thrown out. This type of vehicle renders it extremely difficult for instructors in that the controls necessary to stop the machine being located in front of the person occupying the driver's seat, are practically inaccessible to the instructor and accordingly the likelihood of accidents occurring while an inexperienced person is driving the car under the supervision of an instructor is always present. An important object of this invention is to provide a device corresponding to the emergency brake lever of the vehicle and so located with respect to the driver that a person seated beside the driver as well as the driver may operate the same.

These and other objects I accomplish by the construction and arrangement shown in the accompanying drawings wherein for the purpose of illustration is shown a preferred embodiment of my invention and wherein like reference characters designate like parts throughout.

In the drawings:

Figure 1 is a perspective view showing a control apparatus in accordance with my invention applied to a vehicle; and Figure 2 is a sectional view showing the type of bearing employed for mounting the auxiliary shaft.

Referring now more particularly to the drawings, the numeral 10 designates the side frame bars of a vehicle frame provided at their under surfaces with journals in which a shaft 11, known as the control shaft, is mounted, which shaft extends transversely of the vehicle. At one end this shaft has secured thereto an emergency lever 12. By means of the lever 12 the shaft 11 may be oscillated and this shaft has an operating mechanism 13 thereon for the operation of the service brake and a control lever 14 by means of which the clutch of the vehicle is thrown to the inoperative position when the lever 12 is operated. The shaft 11 is provided centrally with a downwardly bowed portion 15 by means of which it by-passes the transmission housing 16 of the vehicle. The numeral 17 designates the usual control pedals by means of which the transmission is controlled and which pedals are operated by the feet of the driver.

The side bars 10 of the frame which are in the form of angle irons having one flange thereof inwardly directed, have mounted upon their upper surfaces slightly in advance of the shaft 11 bearings 18 having sockets 19 receiving the inwardly directed flanges and secured thereto by means of securing elements 20, such as bolts. In these bearings is mounted the end of a transversely extending shaft 21 which is held against endwise movement by means of stop collars 22 abutting the bearings 18. The shaft 21 has secured thereto an arm 23 which is held against rotation with relation to the shaft and the shaft 11 has a similar arm 24 secured thereto. These arms are connected at their free ends by means of a link 25 pivoted to each thereof, the connection represented by the parts 23, 24 and 25 being located at that side of the shaft 11 remote from the emergency lever 12 as regards the bowed portion 15 of the shaft 11, at which point it is so located that it does not interfere in any manner with the operation of the transmission or any of the mechanism constituting a normal part of the vehicle. The shaft 21 has further secured thereto a pedal lever 26 having at its upper end a pedal P which is secured to the shaft in such manner that it lies at the remote side of the pedals 17 with relation to the emergency lever 12 and is accordingly located approximately centrally of the cockpit of the vehicle. It will be readily seen that by pressure applied to the pedal P when the emergency lever 12 is in the position which it assumes when the vehicle is in operation will cause rotation of the shaft 21 which rotation is imparted through the arms 23 and 24 and link 25 to the shaft 11 causing the emergency lever 12 to assume the inoperative position and the clutch of the vehicle accordingly to be thrown out and the brakes thereof applied.

From the foregoing it is believed to be obvious that an attachment constructed in accordance with my invention may be very cheaply produced and very readily applied to a vehicle without in any manner destroying the present arrangement or construction thereof. It will furthermore be obvious that the construction hereinbefore set forth is capable of some change and modification without materially departing from the spirit of my invention and I accordingly do not limit myself thereto except as hereinafter claimed.

I claim:—

1. In combination with a vehicle frame, a shaft journaled therein, the shaft being provided with a lever whereby it may be oscillated, a clutch and brake mechanism operated from said shaft, of a second shaft mounted for oscillation upon said frame and substantially paralleling the first shaft, an arm secured to each of said shafts, a link connecting the free ends of said arms, and a pedal secured to the last named shaft substantially centrally thereof.

2. In combination with a control shaft having means for disengaging the clutch of a vehicle and for applying the brakes thereof, said shaft being provided centrally with a bowed portion and at one end thereof with an operating lever whereby it may be operated, of a second shaft substantially paralleling the first named shaft and having a pedal whereby it may be oscillated, an arm secured to the first named shaft, a second arm secured to the second named shaft, and a link pivotally connected to the free end of each of said arms, said arms and link connections being arranged at that part of said shafts remote from the lever with relation to said bowed portion.

In testimony whereof I hereunto affix my signature.

JAMES H. HAWLEY.